US012059892B2

(12) United States Patent
Sambhy et al.

(10) Patent No.: US 12,059,892 B2
(45) Date of Patent: Aug. 13, 2024

(54) ELASTOMER IMPREGNATED FIBER COOLER BELT

(71) Applicant: Xerox Corporation, Norwalk, CT (US)

(72) Inventors: Varun Sambhy, Pittsford, NY (US); John Patrick Baker, Rochester, NY (US); Santokh Singh Badesha, Pittsford, NY (US); David Scott Derleth, Webster, NY (US); Piotr Sokolowski, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 67 days.

(21) Appl. No.: 17/510,521

(22) Filed: Oct. 26, 2021

(65) Prior Publication Data

US 2023/0131547 A1 Apr. 27, 2023

(51) Int. Cl.
*B41J 13/08* (2006.01)
*B41J 29/377* (2006.01)

(52) U.S. Cl.
CPC ............ *B41J 13/08* (2013.01); *B41J 29/377* (2013.01)

(58) Field of Classification Search
None
See application file for complete search history.

(56) References Cited

U.S. PATENT DOCUMENTS 4,270,656 A 6/1981 Chesmer et al.
4,772,253 A 9/1988 Koizumi et al.
5,064,509 A 11/1991 Melnyk et al.
5,998,010 A 12/1999 Schlueter, Jr. et al.
6,393,247 B1 * 5/2002 Chen .................. G03G 15/2053 492/53
9,283,789 B2 3/2016 Ueda
9,873,980 B2 1/2018 Eagles et al.
10,688,778 B2 6/2020 Fromm et al.
2009/0098385 A1 4/2009 Kaemper et al.
2011/0142517 A1 6/2011 Kanai et al.
2011/0206902 A1 * 8/2011 Law ................... G03G 15/2057 428/161
2012/0003415 A1 1/2012 Fromm
2012/0224897 A1 9/2012 QI et al.

(Continued)

OTHER PUBLICATIONS

"Non-Leaching Cooler Belt" application filed Jun. 21, 2021, 20210024US01 (XRX-0181-US), 33 pages.

(Continued)

*Primary Examiner* — Alejandro Valencia
(74) *Attorney, Agent, or Firm* — MH2 Technology Law Group LLP

(57) ABSTRACT

Disclosed herein is a substrate cooling unit for use with a duplex aqueous ink jet image forming device. The substrate cooling unit including a first cooling roll. a first transport belt, a second cooling roll positioned downstream of the first cooling roll in a process direction and a second transport belt. The first and second transports belts include a bottom layer of a fiber mesh impregnated with a polydimethylsiloxane, where the fiber mesh is selected from cotton, polyester, and nylon. The first and second transport belts include an optional intermediate adhesive layer and an optional top layer of silicone having an extractable level of less than 4 percent. The substrate cooling unit includes an invertor.

20 Claims, 4 Drawing Sheets

(56) References Cited

U.S. PATENT DOCUMENTS

| | | | | |
|---|---|---|---|---|
| 2014/0029995 | A1* | 1/2014 | Okuda | G03G 15/6573 399/341 |
| 2014/0055511 | A1 | 2/2014 | Smith et al. | |
| 2015/0140882 | A1* | 5/2015 | Qi | G03G 15/2057 442/52 |
| 2015/0220052 | A1 | 8/2015 | Facchini et al. | |
| 2018/0207837 | A1* | 7/2018 | Weaver | C04B 35/565 |
| 2018/0264851 | A1 | 9/2018 | De Roeck et al. | |
| 2020/0171853 | A1 | 6/2020 | Mieney et al. | |

OTHER PUBLICATIONS

Baker, J.P., et al., "Non-Leaching Cooler Belt," U.S. Appl. No. 17/352,927, filed Jun. 21, 2021, 33 pages.

* cited by examiner

ELASTOMER IMPREGNATED FIBER COOLER BELT

BACKGROUND

Technical Field

This disclosure is generally directed to aqueous inkjet transfix apparatuses and methods. In particular, disclosed herein is a cooler belt that is robust and reliable.

Background

Drop on demand ink jet printing systems eject aqueous ink drops from printhead nozzles in response to pressure pulses generated within the printhead by either piezoelectric devices or thermal transducers, such as resistors. The ink drops are ejected toward a recording medium where each ink drop forms a spot on the recording medium. The printheads have a plurality of inkjet ejectors that are fluidly connected at one end to an ink supplying manifold through an ink channel and at another end to an aperture in an aperture plate. The ink drops are ejected through the apertures, which are sometimes called nozzles.

Aqueous ink jet printers are capable of producing either simplex or duplex prints. Simplex printing refers to production of an image on only one side of a recording medium. Duplex printing produces an image on each side of a recording medium. In duplex printing, the recording medium passes through the nip for the transfer of a first image onto one side of the recording medium. The medium is then routed on a path that presents the other side of the recording medium to the nip. By passing through the nip again, a second image is transferred to the other side of the medium. When the recording medium passes through the nip the second time, the side on which the first image was transferred is adjacent the transfix roller.

In an aqueous ink jet printer, the paper needs to cool down to prevent overheating of printheads and overheating of paper at the exit of the printer. To prevent overheating of the paper a cooler belt is used. In the cooler belt there are drums in which individual belts wrap around. These belts are meant to provide pressure to the paper to keep the paper against the cooler roll as well as keep the paper fed straight throughout the machine.

It would be desirable to provide a robust and reliable cooling belt for aqueous inkjet printers.

SUMMARY

Disclosed herein is a substrate cooling unit for use with a duplex aqueous ink jet image forming device. The substrate cooling unit including a first cooling roll. a first transport belt that is in contact with a portion of an outer surface of the first cooling roll to substantially sandwich individual sheets of image receiving media between the first cooling roll and the first transport belt with a first surface of the individual sheets of image receiving media facing the first cooling roll, a second cooling roll positioned downstream of the first cooling roll in a process direction, and a second transport belt that is in contact with a portion of an outer surface of the second cooling roll to substantially sandwich the individual sheets of image receiving media between the second cooling roll and the second transport belt with a second surface of the individual sheets of the image receiving media facing the second cooling roll. The first and second transports belts include a bottom layer of a fiber mesh impregnated with a polydimethylsiloxane, where the fiber mesh is selected from cotton, polyester, and nylon. The first and second transport belts include an optional intermediate adhesive layer and an optional top layer of silicone having an extractable level of less than 4 percent. The second transport belt is operatively connected to a transfix belt actuator to move the top silicone layer of the second transport belt into and out of engagement with the individual sheets of image receiving media. The substrate cooling unit includes an invertor.

There is provided a duplex printing system including an image receiving member, an actuator operatively connected to the image receiving member to rotate the image receiving member, a marking unit including at least one printhead, the marking unit being configured to eject aqueous ink drops onto the image receiving member, a first cooling roll, a first transport belt that is in contact with a portion of an outer surface of the first cooling roll to substantially sandwich individual sheets of image receiving media between the first cooling roll and the first transport belt with a first surface of the individual sheets of image receiving media facing the first cooling roll, a second cooling roll positioned downstream of the first cooling roll in a process direction, and a second transport belt that is in contact with a portion of an outer surface of the second cooling roll to substantially sandwich the individual sheets of image receiving media between the second cooling roll and the second transport belt with a second surface of the individual sheets of the image receiving media facing the second cooling roll. The first and second transport belts include a bottom layer of a fiber mesh impregnated with polydimethylsiloxane, wherein the fiber mesh is selected from cotton, polyester, and nylon and a filler selected from the group consisting of and wherein the bottom layer includes fillers selected from the group consisting of: carbon black, carbon fibers, glass fibers, silica, titania, alumina, iron oxide, boron oxide, zirconia and clay. The first and second transport belts include an optional intermediate adhesive layer and an optional top layer of silicone having an extractable level of less than 4 percent. The second transport belt is operatively connected to a transfix belt actuator to move the top silicone layer of the second transport belt into and out of engagement with the individual sheets of image receiving media. The duplex printing system includes an invertor.

Disclosed herein is a substrate cooling unit for use with a duplex aqueous ink jet image forming device. The substrate cooling unit includes a first cooling roll, a first transport belt that is in contact with a portion of an outer surface of the first cooling roll to substantially sandwich individual sheets of image receiving media between the first cooling roll and the first transport belt with a first surface of the individual sheets of image receiving media facing the first roll, a second cooling roll positioned downstream of the first cooling roll in a process direction, a second transport belt that is in contact with a portion of an outer surface of the second cooling roll to substantially sandwich the individual sheets of image receiving media between the second cooling roll and the second transport belt with a second surface of the individual sheets of the image receiving media facing the second cooling roll. The first and second transports belts include a bottom layer of a fiber mesh impregnated with a polydimethylsiloxane, where the fiber mesh is selected from cotton, polyester, and nylon, an optional intermediate adhesive layer and an optional top layer of silicone having an extractable level of less than 4 percent. The top layer of silicone has a roughness Ra value between 0.2 microns to about 5 microns. The second transport belt is operatively connected to a transfix belt actuator to move the top silicone layer of the second transport belt into and out of engagement with the individual sheets of image receiving media. The duplex printing system includes an invertor.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
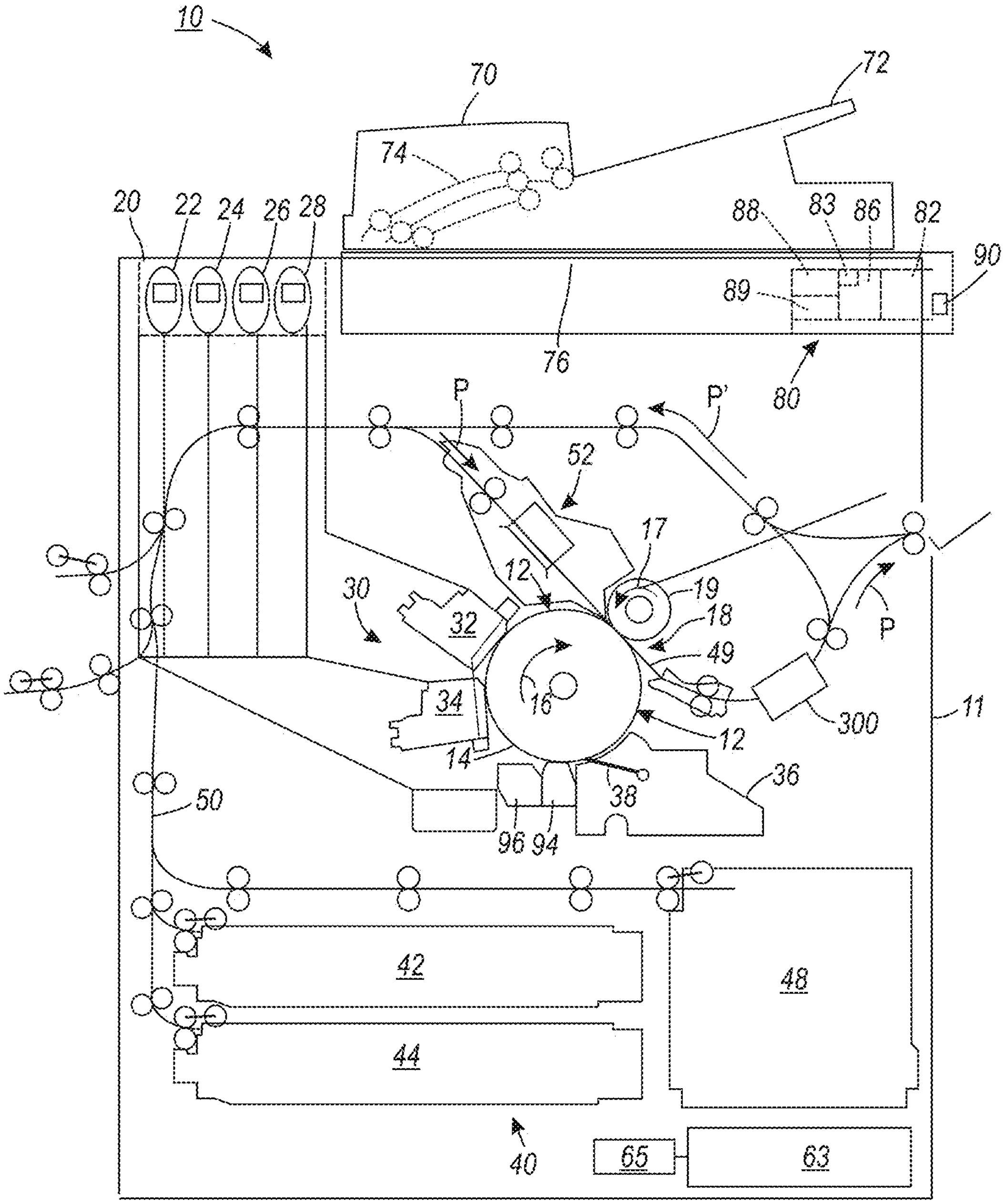
FIG. 1 is a schematic diagram illustrating an aqueous ink image printer of the present disclosure.

It should be noted that some details of the figures have been simplified and are drawn to facilitate understanding of the embodiments rather than to maintain strict structural accuracy, detail, and scale.

DESCRIPTION OF THE EMBODIMENTS

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, or the like. The systems and methods described below may be used with various indirect printer embodiments where ink images are formed on an intermediate image receiving member, such as a rotating imaging drum or belt, and the ink images are subsequently transfixed on media sheets. A "media sheet" or "recording medium" as used in this description may refer to any type and size of medium that printers in the art create images on, with one common example being letter sized printer paper. Each media sheet includes two sides, and each side may receive an ink image corresponding to one printed page.

FIG. 1 depicts an aqueous inkjet printer 10. FIG. 1 depicts an embodiment that can be configured to print ink images. As illustrated, the printer 10 includes a frame 11 to which is mounted directly or indirectly to all its operating subsystems and components, as described below. The aqueous inkjet printer 10 includes an imaging member 12 that is shown in the form of a rotatable imaging drum but can equally be in the form of a supported endless belt. The imaging member 12 has an image receiving surface 14, which provides a surface for formation of the aqueous ink images. A heater in the imaging member 12 generates heat to elevate the temperature of the image receiving surface 14 during imaging operations. The imaging member heater 54 is configured with an adjustable output to heat the image receiving surface 14 to a selected temperature. An actuator 94, such as a servo or electric motor, engages the imaging member 12 and is configured to rotate the imaging member 12 in direction 16. In the printer 10, the actuator 94 varies the rotational rate of the imaging member 12 during different printer operations including maintenance operations, image formation operations, and transfixing operations. A transfix roller 19 rotatable in the direction 17 loads against the surface 14 of drum 12 to form a transfix nip 18 within which ink images formed on the surface 14 are transfixed onto a heated print medium 49. A transfix roller position actuator is configured to move the transfix roller 19 into the position depicted in FIG. 1 to form the transfix nip 18, and to move the transfix roller 19 in a direction to disengage the transfix nip 18 and imaging member 12.

The aqueous inkjet printer 10 also includes an aqueous ink delivery subsystem 20 that has multiple sources of different color aqueous inks. Since the aqueous inkjet printer 10 is a multicolor printer, the ink delivery subsystem 20 includes four (4) sources 22, 24, 26, 28, representing four (4) different colors CMYK (cyan, magenta, yellow, and black) of aqueous inks. Each of the aqueous ink sources 22, 24, 26, and 28 includes a reservoir used to supply the aqueous ink to the printhead assemblies 32 and 34. In the example of FIG. 1, both of the printhead assemblies 32 and 34 receive the aqueous CMYK ink from the ink sources 22-28. In another embodiment, the printhead assemblies 32 and 34 are each configured to print a subset of the CMYK ink colors. Alternative printer configurations print a single color of ink or print a different combination of ink colors.

The aqueous inkjet printer 10 includes a substrate supply and handling subsystem 40. The substrate supply and handling subsystem 40, for example, includes sheet or substrate supply sources 42, 44, 48, of which supply source 48, for example, is a high capacity paper supply or feeder for storing and supplying image receiving substrates in the form of a cut sheet print medium 49. The aqueous inkjet printer 10 as shown also includes an original document feeder 70 that has a document holding tray 72, document sheet feeding and retrieval devices 74, and a document exposure and scanning subsystem 76. A media transport path 50 extracts print media, such as individually cut media sheets, from the substrate supply and handling system 40 and moves the print media in a process direction P. The media transport path 50 passes the print medium 49 through a substrate heater or pre-heater assembly 52, which heats the print medium 49 prior to transfixing an ink image to the print medium 49 in the transfix nip 18.

One or both of the media transport 50 and the pre-heater assembly 52 are configured to heat the print medium 49 to one of a range of temperatures before the print medium 49 passes through the transfix nip 18. In one configuration, the thermal output of the pre-heater assembly is adjusted to raise or lower the temperature of the print medium 49. In another configuration, the media transport 50 adjusts the speed of the print medium 49 as the print medium 49 moves past the pre-heater assembly 52 in the process direction P. The increase in temperature of the print medium 49 as the print medium moves past the pre-heater assembly 52 is related to the thermal output of the pre-heater assembly 52 and inversely related to the speed of the media transport 50.

Media sources 42, 44, 48 provide image receiving substrates that pass through media transport path 50 to arrive at transfix nip 18 formed between the imaging member 12 and transfix roller 19 in timed registration with the aqueous ink image formed on the image receiving surface 14. As the ink image and media travel through the nip, the ink image is transferred from the surface 14 and fixedly fused to the print medium 49 within the transfix nip 18 in a transfix operation. In a duplexed configuration, the media transport path 50 passes the print medium 49 through the transfix nip 18 a second time for transfixing of a second ink image to a second side of the print medium 49. In the printer 10, the media path 50 moves the print medium in a duplex process direction P' through an invertor 90 and returns the print medium 49 to the transfix nip with the first side of the print medium 49 carrying the first ink image engaging the transfix roller 19 and the second side of the print medium 49 engaging the imaging member 12. When a second ink image is formed on the image receiving surface 14, then the second ink image is transfixed to the second side of the print medium in a duplex print operation.

Operation and control of the various subsystems, components and functions of the printer 10 are performed with the aid of a controller or electronic subsystem (ESS) 80. The ESS or controller 80, for example, is a self-contained, dedicated minicomputer having a central processor unit (CPU) 82 with a digital memory 84, and a display or user interface (UI) 86. The ESS or controller 80, for example, includes a sensor input and control circuit 88 as well as an ink drop placement and control circuit 89. In one embodiment, the ink drop placement control circuit 89 is implemented as a field programmable gate array (FPGA). In addition, the CPU 82 reads, captures, prepares and manages the image data and print job parameters associated with print jobs received from image input sources, such as the scanning system 76, or an online or a work station connection 90. As such, the ESS or controller 80 is the main multi-tasking processor for operating and controlling all of the other printer subsystems and functions.

The controller 80 can be implemented with general or specialized programmable processors that execute programmed instructions, for example, printhead operation. The instructions and data required to perform the programmed functions are stored in the memory 84 that is associated with the processors or controllers. The processors, their memories, and interface circuitry configure the printer 10 to form ink images, and, more particularly, to control the operation of inkjets in the printhead modules 32 and 34 to form ink images, and to control the operations of the printer components and subsystems described herein for controlling the gloss level of printed images. The components in the controller 80 are provided on a printed circuit card or provided as a circuit in an application specific integrated circuit (ASIC). Each of the circuits can be implemented with a separate processor or multiple circuits are implemented on the same processor. In alternative configurations, the circuits are implemented with discrete components or circuits provided in very large scale integration (VLSI) circuits. Also, the circuits described herein can be implemented with a combination of processors, FPGAs, ASICs, or discrete components.

In operation, the printer 10 ejects a plurality of ink drops from inkjets in the printhead assemblies 32 and 34 onto the surface 14 of the imaging member 12. The controller 80 generates electrical firing signals to operate individual inkjets in one or both of the printhead assemblies 32 and 34. In the multi-color printer 10, the controller 80 processes digital image data corresponding to one or more printed pages in a print job, and the controller 80 generates two-dimensional bit maps for each color of ink in the image, such as the CMYK colors.

The printer 10 is an illustrative embodiment of a printer. Additionally, while printer 10 is an indirect printer, printers that eject ink drops directly onto a print medium can be operated using the processes described herein.

In the printer 10, the paper needs to cool down to prevent overheating of printheads and the overheating of paper at the exit of the printer. To prevent the overheating of the paper a cooler 300 is used. In the cooler 300 there are drums in which individual belts wrap around. These belts are meant to provide pressure to the paper to keep the paper against the cooler roll as well as keep the paper fed straight throughout the machine. A schematic for a cooling module 300 is shown in FIG. 2.

Figure 2:
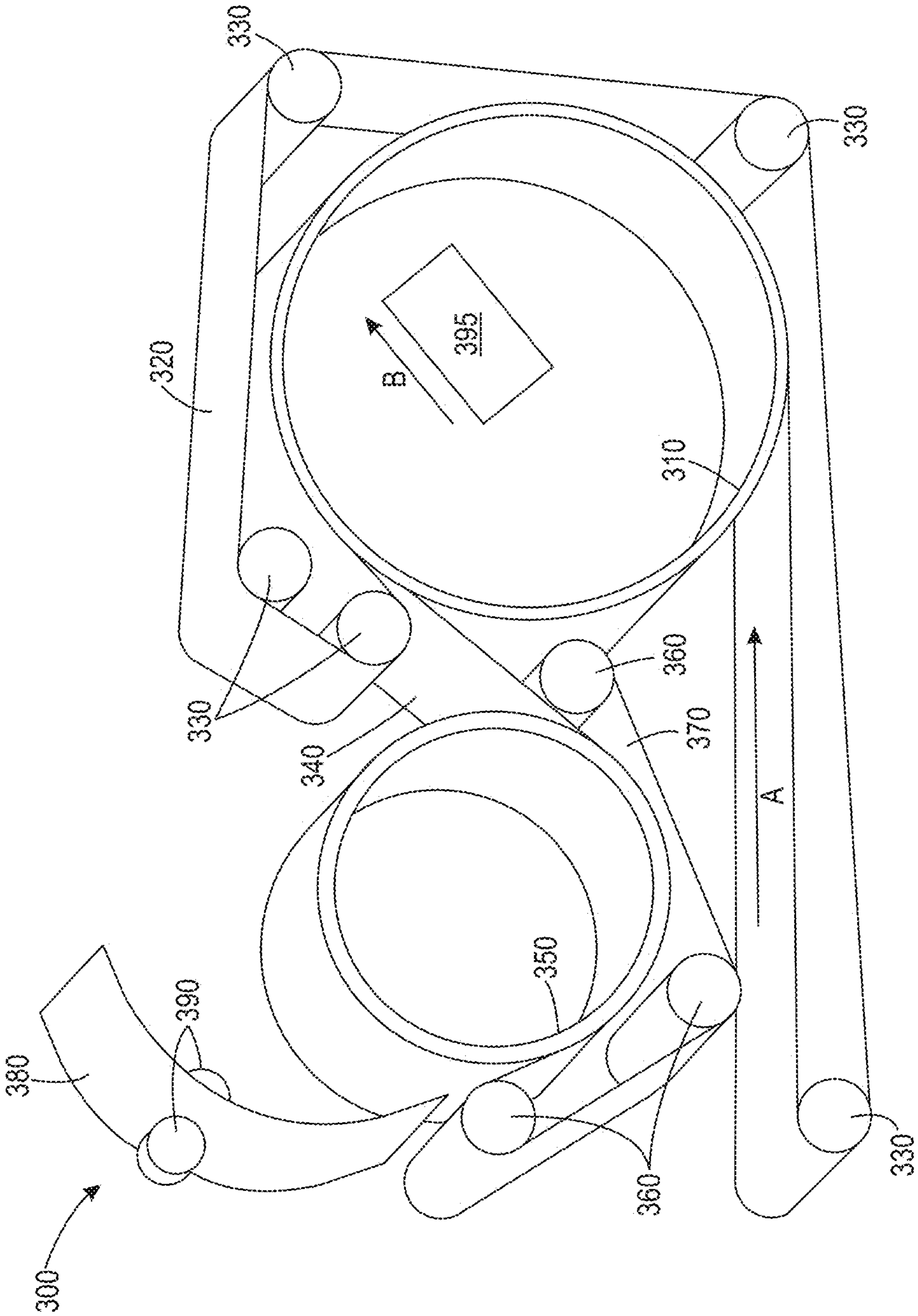
FIG. 2 is a schematic embodiment of a cooling and decurling module of the present disclosure.
Figures 3A, 3B, 3C, 3D:
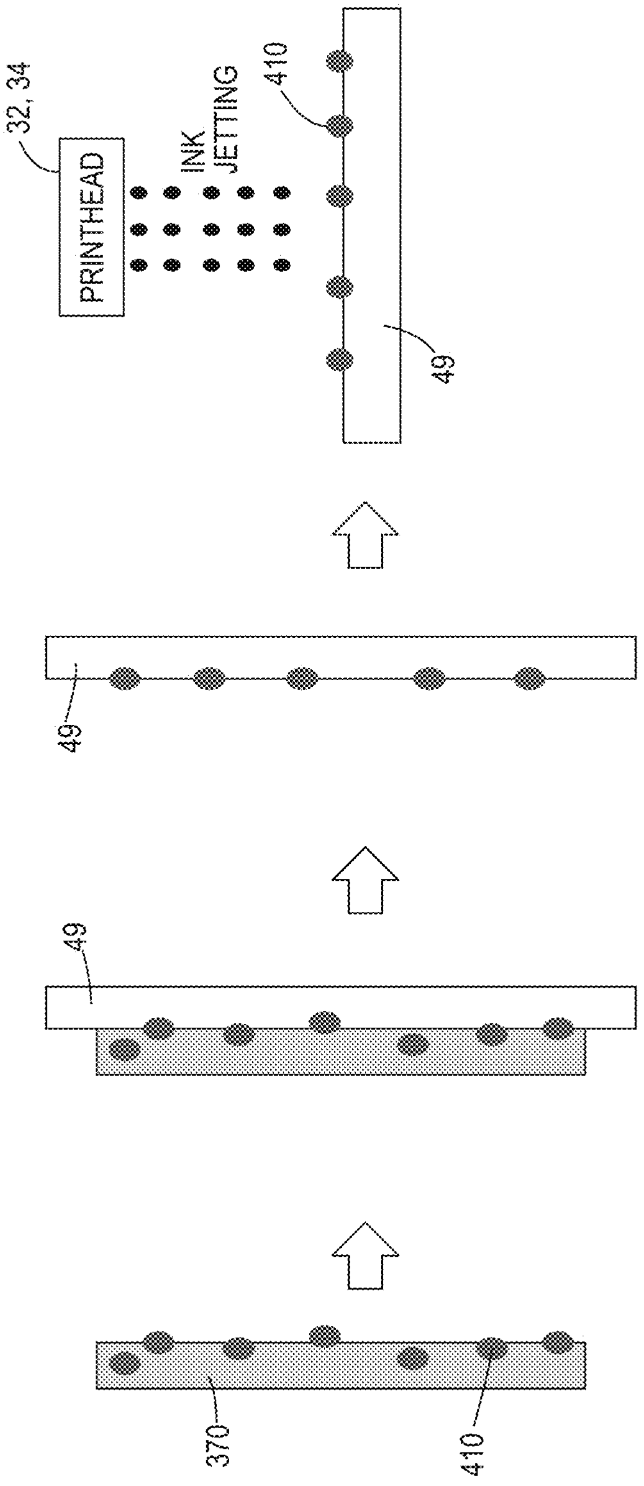
FIGS. 3(A)-3(D) show an illustration of a problem in conventional duplex printers.

In certain cases, the printer 10 includes a de-curling and cooling module 300, as shown in FIG. 2. FIG. 2 illustrates an exemplary embodiment of internal details of a particularly configured cooling and de-curling module 300. As shown, an image receiving media flow path through the particularly configured cooling and de-curling module 300 may be configured in generally a horizontal "S" shape about two rotatable cooling drums 310, 350. Individual sheets of image receiving media substrate may exit an image forming device, such as image forming device 10 shown in FIG. 1, through a currently-configured exit port in the image forming device through path P or P'.

The individual sheets of image receiving media substrates may enter the cooling and de-curling module 300 in a manner that allows them to be translated along an image receiving media substrate transport path that begins in a direction A on a first belt 320. The first belt 320 may be a woven belt that is threaded around a plurality of first idler rolls 330. The individual sheets of image receiving media substrates may be cooled by conduction as the individual sheets are pressed first between the first belt 320 and the first of a pair of rotating cooling drums, the first drum 310, curling the individual sheets in a first direction, while the individual sheets of image receiving media substrates are still comparatively hot and, therefore, more pliable.

The flow path may continue as the individual sheets are stripped from the first drum 310 by an intermediate baffle 340 and guided toward a second belt 370. The second belt 370 may be threaded around a plurality of second idler rolls 360. The individual sheets of image receiving media substrates may be cooled by conduction as the individual sheets are pressed then between the second belt 370 and the second of the pair of rotating cooling drums, the second drum 350, curling the individual sheets in a second direction, when the individual sheets of image receiving media substrates are comparatively cooler and less pliable. From there, the individual sheets may be directed, or otherwise stripped, away from the second roll 350 by final baffling 380 supported by one or more support rolls 390. The individual sheets are output to the invertor 90. As shown in FIG. 2, a configuration of the cooling and de-curling module 300 includes a first drum 310 having a larger diameter than a second drum 350. If there were no difference in the size of the first and second drums, the second drum may be ineffective in removing any residual curling imparted by the first drum while the substrate is still warm and then the substrate cools. That being stated, no limiting configuration to the individual sizes of the cooling drums is intended.

As indicated above, the pair of belts supported by the individual sets of idler rolls and in contact with the pair of rotating cooling drums present a general configuration of a paper path in the form of a horizontal "S" shape.

The first drum 310 and the second drum 350 may be cooled by blowing air substantially transversely through, orthogonally to or axially down an axis of the first drum 310 and the second drum 350. The first drum 310 and/or the second drum 350 may alternatively be cooled by blowing air substantially radially toward an inside diameter of the first drum 310 or the second drum 350, using, for example, a cooling unit 395 that may force air in a direction B impinging on an interior of the first drum 310.

The root cause of the problem in duplex printer is shown in the scheme illustrated in FIGS. 3(A)-3(D). The cooling belts 370 and 320 are typically silicone polymers. Many silicone polymer belts have unreacted oligomers and monomers 410 that can leach out (FIG. 3(A)) and contaminate the duplex side of the paper or substrate when the print media 49 and belt come into contact (FIG. 3(B)). The silicone contaminants are transferred to the duplex side of the print media 49 (FIG. 3(C)). After passing through the invertor 90 (FIG. 1) to be imaged on the duplex side, aqueous ink dewets on the silicone contaminants which leads to contaminated print media 49 and to print defects (FIG. 3(D)).

Figure 4:
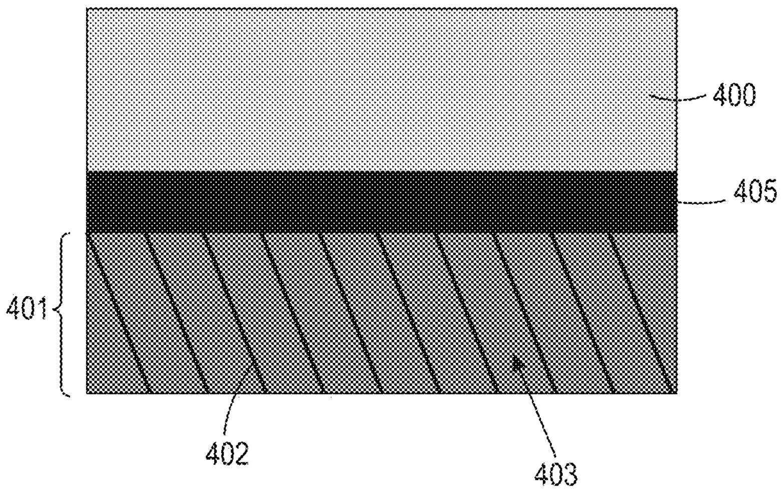
FIG. 4 shows a cross-sectional view of an embodiment of cooling belt of the present disclosure.

The cooling belt construction (320, 370 (FIG. 2)) of the present disclosure is shown in FIG. 4. The belts 320, 370 may be constructed on a drum mandrel. The belts 320, 370 includes one or more layers. The bottom layer 401 includes a fiber mesh 402 impregnated with polydiemethylsiloxane (PDMS) 403. The fiber mesh 402 is selected from cotton, polyester, and nylon. The bottom layer 401 can be constructed by spinning individual yarn (threads) of the fiber (cotton, polyester, or nylon) onto a mandrel, or it may be constructed by mounting a preformed fabric sock or sleeve of the fiber onto the mandrel. The belt is removed from the mandrel to yield a free-standing belt. The top layer 400 may have a thickness of from 300 microns to 3000 microns, or in embodiments from 50 microns to 3000 microns. The fiber mesh 402 can be woven or non-woven.

The middle layer 405 is an optional adhesive layer that is flow coated or spray coated onto the bottom layer 401 to improve the adhesion between the top silicone layer 400 and the bottom layer 401. The adhesive layer 405 is an optional layer and only necessary if there is a top layer 400. In some embodiments the top layer 400 may be directly adhered to the bottom layer 401 of fiber mesh 402 impregnated with PDMS 403 or composites of polydimethylsiloxane with fillers like carbon black, carbon fibers, glass fibers, silica, titania, alumina, iron oxide, boron nitride, zirconia, clays or mixtures of fillers thereof. The optional adhesive layer 405 may have a thickness of from 10 microns to 500 microns. In some embodiments, the top layer 400 is a selected silicone layer that is flow coated or spray coated onto the adhesive layer 405 or directly onto the bottom layer 401.

Fillers are typically added to improve mechanical, wear and/or the thermal conduction properties of the top layer 400. The top layer 400 can have a thickness from 50 to 3000 microns. The top layer 400 may be cured by a platinum-catalyzed cure system, a condensation cure system, a peroxide cure system, or an oxime cure system familiar to those skilled in the art. The curing process can be accelerated or driven to a higher degree of completion by increasing temperature.

The mean roughness Ra values of the top layer 400 are between 0.2 microns to about 5 microns.

The top layer 400 is cured such that it has an amount of extractables of less than 4 percent, or in embodiments less than 3.5 percent of extractables, or less than 3.2 percent. The extractables are a measure of the residual unreacted monomers or oligomers that are not bonded to the elastomer and can leach out over time.

If the cooling belt (FIG. 2, 320, 370) has unreacted or unbound oligomers and monomers they can leach out and contaminate the duplex side of the paper when the paper and belt come into contact as shown in FIG. 3(A)-3(D). Then when ink is jetted on the contaminated duplex side, it does not wet/spread well. This can cause a plow like print defect.

The extractable level of the top layer 400 described herein is measured as follows. A piece of belt is cut to provide a sample of approximately 1 g in weight. The weight is recorded and the sample is placed in bottle. 25 g of methyl ethyl ketone (MEK solvent) is added to the bottle and the sample sits for 72 hours to allow unreacted monomers to extract into MEK solvent. The sample is removed and dried at 120° C. for 2 hours and the weight loss is measured and compared to the initial weight. The weight loss percentage is herein referred to the extractable percentage, i.e. the weight amount of the species in the belt that is unbound to the polymer matrix of the belt and can be extracted out into a solvent upon soaking.

The extractable levels can be lowered by driving the silicone curing reaction to further completion by increasing curing temperature and/or the curing time.

At least one benefit of the cooling belt disclosed herein relative to conventional silicone belts is that the plowing defects no longer appear on the duplex side of coated paper prints.

The ink compositions that can be used with the present embodiments are aqueous-dispersed polymer or latex inks. Such inks are desirable to use since they are water-based inks that are said to have almost the same level of durability as solvent inks. In general, these inks comprise one or more polymers dispersed in water. The inks disclosed herein also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include food dyes such as Food Black No.1, Food Black No.2, Food Red No. 40, Food Blue No.1, Food Yellow No.7, and the like, FD & C dyes, Acid Black dyes (No.1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza (18)annulenes, formazan copper complexes, triphenodioxazines, and the like; and the like, as well as mixtures thereof. The dye is present in the ink composition in any desired or effective amount, in one embodiment from about 0.05 to about 15 percent by weight of the ink, in another embodiment from about 0.1 to about 10 percent by weight of the ink, and in yet another embodiment from about 1 to about 5 percent by weight of the ink, although the amount can be outside of these ranges.

Examples of suitable pigments include black pigments, white pigments, cyan pigments, magenta pigments, yellow pigments, or the like. Further, pigments can be organic or inorganic particles. Suitable inorganic pigments include, for example, carbon black. However, other inorganic pigments may be suitable, such as titanium oxide, cobalt blue ($CoO—Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW 18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the aqueous vehicle and to prevent clogging of the ink channels when the ink is used in a aqueous ink jet printer.

The inks disclosed herein also contain a surfactant. Any surfactant that forms an emulsion of the polyurethane elastomer in the ink can be employed. Examples of suitable surfactants include anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurote, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC PE/F, such as SYNPERONIC PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used. The surfactant is present in any desired or effective amount, in one embodiment at least about 0.01 percent by weight of the ink, and in one embodiment no more than about 5 percent by weight of the ink, although the amount can be outside of these ranges. It should be noted that the surfactants are named as dispersants in some cases.

Other optional additives to the aqueous inks include biocides, fungicides, pH controlling agents such as acids or bases, phosphate salts, carboxylates salts, sulfite salts, amine salts, buffer solutions, and the like, sequestering agents such as EDTA (ethylene diamine tetra acetic acid), viscosity modifiers, leveling agents, and the like, as well as mixtures thereof.

EXAMPLES

The root cause of printing defects that occur with silicone cooling belts is a plowing defect. The following bench test was conducted.

The extractable level of the silicone belt described herein were measured as described—Cut a piece of belt sample approx. 1 g in weight. Record initial weight and place in bottle. Add 25 g MEK solvent. Let sample sit 72 hrs to allow unreacted monomers to extract into MEK solvent. Take out sample, dry the belt sample at 120C/2 hr and measure weight loss with respect to the initial weight. The weight loss % is herein referred to the extractable % i.e. the weight amount of the species in the belt that is unbound to the polymer matrix of the belt and can be extracted out into a solvent upon soaking. The extractable % of a representative top layer of a belt cured at 150C for 1 hour was 5.9%. This belt showed the plow like print defect. A second silicone belt was cured at 200C for 2 hours. The extractable or unreacted unbound monomers capable of leaching out in the belt described herein were found to be 3.1%. The belt with 3.1% extractable amount did not show plow like IQ defect.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A substrate cooling unit for use with a duplex aqueous ink jet image forming device, comprising:

a first cooling roll;

a first transport belt that is in contact with a portion of an outer surface of the first cooling roll to substantially sandwich individual sheets of image receiving media between the first cooling roll and the first transport belt with a first surface of the individual sheets of image receiving media facing the first cooling roll;

a second cooling roll positioned downstream of the first cooling roll in a process direction;

a second transport belt that is in contact with a portion of an outer surface of the second cooling roll to substantially sandwich the individual sheets of image receiving media between the second cooling roll and the second transport belt with a second surface of the individual sheets of the image receiving media facing the second cooling roll, wherein the first and second transports belts comprise:

a bottom layer of a fiber mesh impregnated with a polydimethylsiloxane, where the fiber mesh is selected from cotton, polyester, and nylon;

an intermediate adhesive layer; and a top layer of silicone having an extractable level of less than 4 percent wherein the second transport belt is operatively connected to a transfix belt actuator to move the top layer of silicone of the second transport belt into and out of engagement with the individual sheets of image receiving media; and an invertor.

2. The substrate cooling unit of claim 1, wherein the bottom layer comprises a thickness of from about 100 microns to about 3000 microns.

3. The substrate cooling unit of claim 1, wherein the fiber mesh is cross woven.

4. The substrate cooling unit of claim 1, wherein the fiber mesh is unidirectional.

5. The substrate cooling unit of claim 1, wherein the bottom layer includes fillers selected from the group consisting of: carbon black, carbon fibers, glass fibers, silica, titania, alumina, iron oxide, boron oxide, zirconia and clay.

6. The substrate cooling unit of claim 1, wherein the top layer includes fillers selected from the group consisting of: carbon black, carbon fibers, glass fibers, silica, titania, alumina, iron oxide, boron oxide, zirconia and clay.

7. The substrate cooling unit of claim 1, wherein the top layer comprises a thickness of from 50 microns to 3000 microns.

8. A duplex printing system comprising:

an image receiving member;

an actuator operatively connected to the image receiving member to rotate the image receiving member;

a marking unit including at least one printhead, the marking unit being configured to eject aqueous ink drops onto the image receiving member;

a first cooling roll;

a first transport belt that is in contact with a portion of an outer surface of the first cooling roll to substantially sandwich individual sheets of image receiving media between the first cooling roll and the first transport belt with a first surface of the individual sheets of image receiving media facing the first cooling roll;

a second cooling roll positioned downstream of the first cooling roll in a process direction;

a second transport belt that is in contact with a portion of an outer surface of the second cooling roll to substantially sandwich the individual sheets of image receiving media between the second cooling roll and the second transport belt with a second surface of the individual sheets of the image receiving media facing the second cooling roll wherein the first and second transport belts comprise:

a bottom layer of a fiber mesh impregnated with polydimethylsiloxane, wherein the fiber mesh is selected from cotton, polyester, and nylon and a filler selected from the group consisting of wherein the bottom layer includes fillers selected from the group consisting of: carbon black, carbon fibers, glass fibers, silica, titania, alumina, iron oxide, boron oxide, zirconia and clay;

an intermediate adhesive layer; and a top layer of silicone having an extractable level of less than 4 percent wherein the second transport belt is operatively connected to a transfix belt actuator to move the top layer of silicone of the second transport belt into and out of engagement with the individual sheets of image receiving media; and an invertor.

9. The duplex printing system of claim 8, wherein the bottom layer comprises a thickness of from about 100 microns to about 3000 microns.

10. The duplex printing system of claim 8, wherein the fiber mesh is cross woven.

11. The duplex printing system of claim 8, wherein the fiber mesh is unidirectional.

12. The duplex printing system of claim 8, wherein the intermediate adhesive layer comprises a thickness of from about 10 microns to about 500 microns.

13. The duplex printing system of claim 8, wherein the top layer comprises a thickness of from 50 microns to 3000 microns.

14. A substrate cooling unit for use with a duplex aqueous ink jet image forming device, comprising:

a first cooling roll;

a first transport belt that is in contact with a portion of an outer surface of the first cooling roll to substantially sandwich individual sheets of image receiving media between the first cooling roll and the first transport belt with a first surface of the individual sheets of image receiving media facing the first roll;

a second cooling roll positioned downstream of the first cooling roll in a process direction;

a second transport belt that is in contact with a portion of an outer surface of the second cooling roll to substantially sandwich the individual sheets of image receiving media between the second cooling roll and the second transport belt with a second surface of the individual sheets of the image receiving media facing the second cooling roll, wherein the first and second transports belts comprise:

a bottom layer of a fiber mesh impregnated with a polydimethylsiloxane, where the fiber mesh is selected from cotton, polyester, and nylon;

an intermediate adhesive layer; and a top layer of silicone having an extractable level of less than 4 percent, wherein the top layer of silicone has a roughness Ra value between 0.2 microns to about 5 microns, wherein the second transport belt is operatively connected to a transfix belt actuator to move the top layer of silicone of the second transport belt into and out of engagement with the individual sheets of image receiving media; and an invertor.

15. The substrate cooling unit of claim 14, wherein the bottom layer comprises a thickness of from about 100 microns to about 3000 microns.

16. The substrate cooling unit of claim 14, wherein the fiber mesh is cross woven.

17. The substrate cooling unit of claim 14, wherein the fiber mesh is unidirectional.

18. The substrate cooling unit of claim 14, wherein the bottom layer includes fillers selected from the group consisting of: carbon black, carbon fibers, glass fibers, silica, titania, alumina, iron oxide, boron oxide, zirconia and clay.

19. The substrate cooling unit of claim 14, wherein the intermediate adhesive layer comprises a thickness of from about 10 microns to about 500 microns.

20. The substrate cooling unit of claim 14, wherein the top layer comprises a thickness of from 30 microns to 3000 microns.

* * * * *